US009532236B2

(12) United States Patent
Gunnarsson et al.

(10) Patent No.: US 9,532,236 B2
(45) Date of Patent: Dec. 27, 2016

(54) METHODS AND ARRANGEMENTS FOR SETTING PROPERTIES OF A RELAY/REPEATER NODE IN A RADIO COMMUNICATION NETWORK

(75) Inventors: Fredrik Gunnarsson, Linköping (SE); Pontus Wallentin, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 285 days.

(21) Appl. No.: 13/698,141

(22) PCT Filed: May 17, 2010

(86) PCT No.: PCT/IB2010/052192
§ 371 (c)(1),
(2), (4) Date: Nov. 15, 2012

(87) PCT Pub. No.: WO2011/144963
PCT Pub. Date: Nov. 24, 2011

(65) Prior Publication Data
US 2013/0065512 A1   Mar. 14, 2013

(51) Int. Cl.
*H04B 7/155* (2006.01)
*H04W 24/02* (2009.01)
(Continued)

(52) U.S. Cl.
CPC ............. *H04W 24/02* (2013.01); *H04B 7/155* (2013.01); *H04W 72/042* (2013.01); *H04W 84/047* (2013.01)

(58) Field of Classification Search
CPC .................... H04B 7/155–7/17; H04W 24/02; H04W 72/042; H04W 84/047
(Continued)

(56) References Cited

U.S. PATENT DOCUMENTS 6,751,227 B1   6/2004   Ahmavaara et al.
8,626,181 B2 *  1/2014   Kang et al. ............... 455/452.2
(Continued)

OTHER PUBLICATIONS

3GPP "Relay Architectures for E-UTRA (LTE-Advanced) (Release 9)". R2-101900 TR36806 V200, 3$^{rd}$ Generation Partnership Project (3GPP), Mobile Competence Centre. Sophia-Antipolis Cedex, France. Feb. 26, 2010. XP050450793.
(Continued)

*Primary Examiner* — Raymond Dean
(74) *Attorney, Agent, or Firm* — Boisbrun Hofman, PLLC

(57) ABSTRACT

The present disclosure provides methods and apparatuses for setting properties of a forwarding node. The forwarding node represents a relay or a repeater. The method includes establishing a connection for sending Direct Transfer messages between the forwarding node and a radio network node and sending to the radio network node a first Direct Transfer message. The first Direct Transfer message includes a relay indication, indicating to the radio network node that the first Direct Transfer message was sent from a forwarding node. The method also includes receiving from the radio network node a second Direct Transfer message, comprising setting information for setting properties of the forwarding node and setting the properties of the forwarding node based on the setting information.

20 Claims, 4 Drawing Sheets

(51) Int. Cl.
*H04W 72/04* (2009.01)
*H04W 84/04* (2009.01)

(58) Field of Classification Search
USPC ............ 455/450–452.2, 509, 7–11.1, 14–25;
370/315, 329
See application file for complete search history.

(56) References Cited

U.S. PATENT DOCUMENTS

| | | |
|---|---|---|
| 2006/0193286 A1* | 8/2006 | Naghian et al. .............. 370/328 |
| 2008/0144522 A1 | 6/2008 | Chang et al. |
| 2009/0053994 A1* | 2/2009 | Senarath et al. ............. 455/11.1 |
| 2009/0197624 A1* | 8/2009 | Kwak et al. .................. 455/517 |
| 2010/0255850 A1* | 10/2010 | Kaukoranta et al. ......... 455/450 |
| 2010/0265872 A1* | 10/2010 | Wu ............................... 370/315 |
| 2012/0002594 A1 | 1/2012 | Racz et al. |

OTHER PUBLICATIONS

Zhang, et al "RS Initial Network Entry and Re-Entry." Jan. 18, 2007. XP002625460.

* cited by examiner

METHODS AND ARRANGEMENTS FOR SETTING PROPERTIES OF A RELAY/REPEATER NODE IN A RADIO COMMUNICATION NETWORK

TECHNICAL FIELD

The present invention relates to methods and arrangements in a radio communication network. In particular, the present invention relates to methods and arrangements in a relay/repeater node and a radio network node for setting properties of the relay/repeater node.

BACKGROUND

In radio communication networks, such as telecommunication networks, efforts have been made to offer seamless wireless communications services essentially everywhere.

This has been achieved by providing so called macro cells, which for many applications often provide acceptable service coverage and quality. Nevertheless, some areas such as important and/or very populated buildings are subject to other, more specialized, solutions. In some areas, the use of macro cells is insufficient, i.e. service coverage and quality is insufficient. Furthermore, it is not economically viable to consider other, more specialized solutions. Hence, there is a need for another solution to provide acceptable service coverage and quality in these areas, which may be underground garages, tunnels, apartment flats, subways and more.

One solution in such cases is to deploy repeaters. Essentially, the radio signals are received at one antenna and forwarded at another, possibly after some amplification. A related solution is to deploy relays, in which radio signals are decoded to extract a message. Then the message is coded and forwarded, possibly after some amplification. In both solutions, a mobile terminal is connected to a cell, but via a repeater or a relay. The cell is served by a radio base station, comprised in, for example, a telecommunication network.

In the following a short comparison between repeaters and relays is presented. First, repeaters forwards (and optionally amplifies) the radio signals and any noise present. This usually has a negative impact on the donor cell. All received radio signals at the pick-up antenna are repeated. The repeater can not select which radio signals to forward. Hence, the repeater need not have any knowledge about the communication protocols of the radio signals being forwarded. Next, relays forwards regenerated radio signals and it can be selective when forwarding radio signals. Since the radio signals are regenerated the regenerated signal may comprise less noise. However, the relay has to comply with the radio communications protocols of the radio signals being forwarded.

A problem with repeaters/relays is that they can make a mobile terminal contribute to the received signal at a base station antenna at higher levels than desired. For example, the repeater/relay may amplify with a high gain, and the mobile terminal may transmit at its minimum power level. This may jeopardize the stability of the system and the quality of service for other connections. Moreover, repeaters/relays may be active on a regular basis, also when not activated by a mobile terminal. This leads to unnecessary energy consumption.

Radio communication networks are typically separated into Radio Access Network (RAN) and Core Network, comprising a core network node. The signalling between the mobile terminal and the radio access network is referred to as the Access Stratum (AS), while the signalling between the mobile terminal and the core network node is referred to as the Non-Access Stratum (NAS). These NAS message are carried in container messages, typically referred to as Direct Transfer messages, between the mobile and the radio access network, such as base stations, radio network controllers etc. The radio access network, forwards NAS messages from the mobile terminal to the designated core network node. Each radio base station broadcasts information about the connected core network to mobile terminals. This information is used to tag the NAS message with information about the intended core network node, such as the expected core network type, the intended public land mobile network, encryption information and more. The actual NAS message part of the broadcasted information is a bit string that may be interpreted by the receiving core network node.

SUMMARY

An object of the present invention is to provide methods and arrangements in a relay/repeater node and a radio network node which improves stability of the radio communication system and/or reduces interference with other connections within the radio communication system.

According to an aspect of the invention, the object is achieved by a method in a relay node or a repeater node, referred to as "a relay node", for setting properties of the relay node. The relay node and a radio network node are comprised in a radio communication network. In a step, the relay node establishes a connection for sending Direct Transfer messages between the relay node and the radio network node. Next, the relay node sends to the radio network node a first Direct Transfer message, comprising a relay indication, indicating to the radio network node that the first Direct Transfer message is sent from the relay node. In another step, the relay node receives from the radio network node a second Direct Transfer message, comprising setting information for setting properties of the relay node. Further, the relay node sets the properties of the relay node based on the setting information.

According to another aspect of the present invention, the object is achieved by an arrangement in a repeater node or relay node, referred to as "a relay node", for setting properties of the relay node. The relay node and a radio network node are comprised in radio communication network. The arrangement comprises a processing unit configured to establish a connection for sending Direct Transfer messages between the relay node and the radio network node, and a sending unit configured to send a first Direct Transfer message to the radio network node. The first Direct Transfer message comprises a relay indication, indicating to the radio network node that the first Direct Transfer message is sent from the relay node. Furthermore, the arrangement comprises a receiving unit configured to receive from the radio network node a second Direct Transfer message, comprising setting information for setting properties of the relay node. The processing unit is further configured to set the properties of the relay node based on the setting information.

According to a further aspect of the present invention, the object is achieved by a method in a radio network node for setting properties of a relay node or a repeater node, referred to as "a relay node". The relay node and the radio network node are comprised in a radio communication network. In a step, the radio network node sets up a connection on request from the relay node (110). In another step, the radio network node receives from the relay node a first Direct Transfer message, comprising a relay indication, indicating to the radio network node that the first Direct Transfer message is received from the relay node. In a further step, the radio network node sends to the relay node a second Direct Transfer message, comprising setting information for setting properties of the relay node.

According to yet another aspect of the present invention, the object is achieved by an arrangement in a radio network node for setting properties of a relay node or a repeater node, referred to as "a relay node". The relay node and the radio network node are comprised in a radio communication network. The arrangement comprises a processing unit configured to set up a connection on request from the relay node. The arrangement further comprises a receiving unit configured to receive from the relay node a first Direct Transfer message, comprising a relay indication, indicating to the radio network node that the first Direct Transfer message is received from the relay node, and a sending unit configured to send to the relay node a second Direct Transfer message, comprising setting information for setting properties of the relay node.

An idea of the invention is to introduce a relay indication within a first Direct Transfer message in order to provide an indication to a radio network node that the radio network node is communicating with a relay node. In this manner, the radio network node may detect that the Direct Transfer message is received from a relay node. Expressed differently, the radio network node may capture the first Direct Transfer message, thanks to the relay indication, it shall be understood that the normal procedure is that the radio network node forwards Direct Transfer messages to a core network node, comprised in the radio communication network. Therefore, as a consequence of the relay indication within the first Direct Transfer message, it is possible to send to the relay node a second Direct Transfer message, comprising setting information for setting properties thereof. Again, it shall be understood that the normal procedure is that Direct Transfer messages originates from, i.e., are generated and sent by, the core network node, but due to the introduced relay indication the radio network node may generate and send Direct Transfer messages that relay nodes are capable of interpreting, i.e. relay nodes are able to relate and react to these Direct Transfer messages. For example, the power output from the relay node may be reduced to decrease interference with other connections. As a result, the above mentioned object is achieved.

An advantage with the methods and arrangements according to embodiments of the present invention is that radio network nodes not being configured according the invention will do nothing when receiving the relay indication. Thus, the present invention is backward compatible.

Further features of and advantages with, the present invention will become apparent when studying the appended claims and the following description. It is to be understood that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
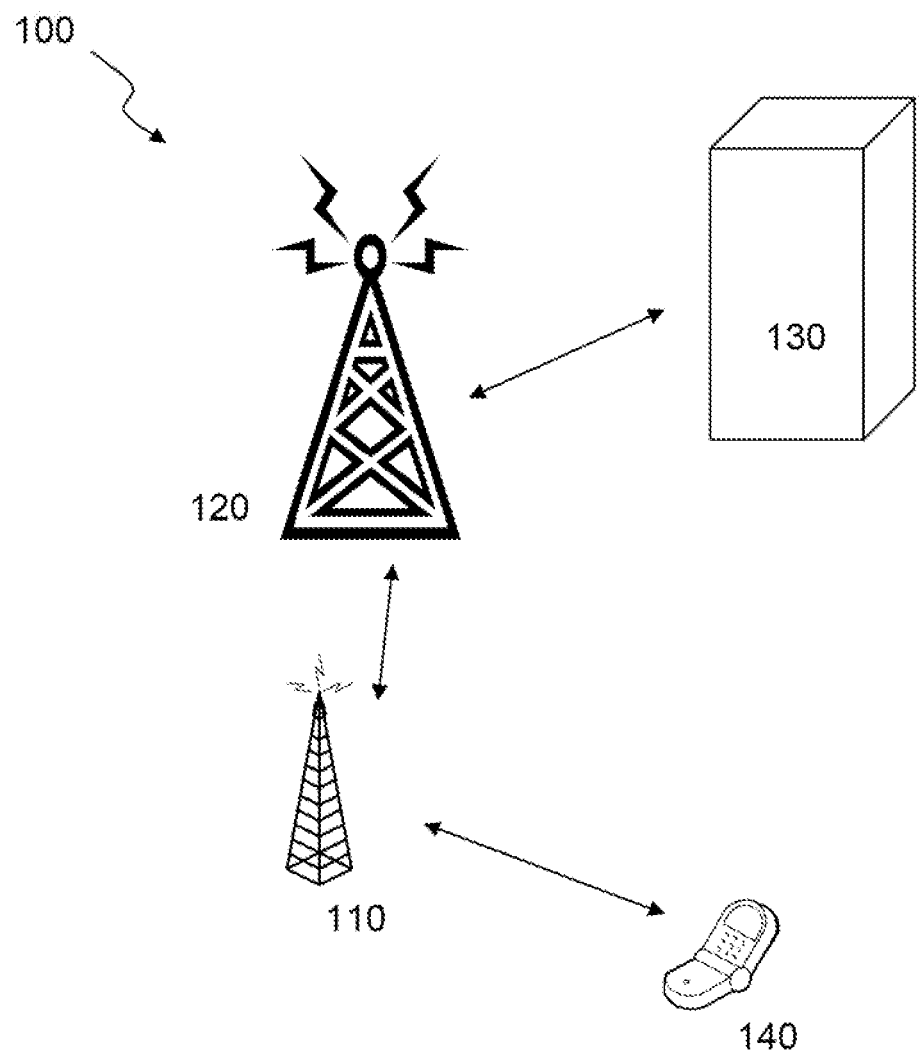
FIG. 1 shows a schematic overview of an exemplifying radio communication network.

Throughout the following description similar reference numerals have been used to denote similar elements, parts, items or features, when applicable.

It may be noted that, as used herein, the expression "relay node" denotes "repeater node or relay node". A relay node may, for example be a repeater unit and/or a relay unit.

It is to be understood that the expression "mobile terminal" may comprise a cellular telephone, a user equipment, a personal data assistant (PDA), a pager, and/or computer that is configured to communicate, data over a wireless communication interface. As used herein, "mobile terminals" may be portable, transportable, installed in a vehicle (aeronautical, maritime, or land-based), or situated and/or configured to operate locally and/or in a distributed fashion.

In order to elucidate the difference between the present invention and prior art, a brief description of two known procedures are put forward.

A first procedure, in a WCDMA architecture, is described in the following. A User Equipment (UE) is the mobile terminal by which a subscriber may access services offered by an operator's Core Network (CN). The network is identified by its PLMN (Public Land Mobile Network) identifier (or identifiers). The Radio Access Network (RAN) is responsible for the radio transmission and control of a radio connection. The Radio Network Subsystem (RNS) controls a number of Base Stations in the radio access network. The Radio Network Controller (RNC) controls radio resources and radio connectivity within a set of cells. The Base Station (BS) handles the radio transmission and reception within one or more cells. A cell covers a geographical area. The radio coverage in a cell is provided by radio base station equipment at the base station site. Each cell is identified by a unique identity, which is broadcasted in the cell. There may be more than one cell covering the same geographical area. A Radio Link is a representation of the communication between a UE and one cell in the Radio Access Network. Iub/Iur interfaces: Interfaces connecting the different nodes in the RAN. User data is transported on so-called transport bearers on these interfaces.

When a UE is idle, the network only maintains a crude estimate of its location. When establishing a connection, the UE needs to contact the core network via the radio access network. First, the UE decodes the broadcasted system information to acquire information about and configurations of the access and connection establishment procedure. Second, the UE establishes a RRC connection to the radio access network. Essentially, this provides signalling means in uplink and downlink. Then, the UE notifies the core network via an Initial Direct Transfer message to the radio access network about its intentions, and to enable initiation of for example, subscription lookup and billing. The Initial Direct Transfer message may comprise a NAS message as a bit sequence to be interpreted by the core network a PLMN identity, i.e. the PLMN the mobile intends to establish the connection with a Core network domain identity, which is either the circuit switched or packet switched domain, an Intra Domain NAS Node Selector containing more detailed information about which core network the Direct Transfer message shall be routed to, and/or an establishment cause, indicating a reason to why the mobile is establishing a connection, selected from an enumerated list of causes.

A second procedure, in an LTE or LTE-advance architecture, is described in the following. In LTE, base stations are denoted eNB and are capable of communicating directly with each other over an X2 interface or via a mobility manager entity (MME) over an S1 interface.

In LTE, initial Direct Transfer signalling for connection setup is included in the RRC connection setup procedure. First, the UE (again the mobile terminal is a user equipment) decodes the broadcasted system information to acquire information about and configurations of the access and connection establishment procedure. Then, the UE requests an RRC connection. The establishment cause is included in the RRCConnection request message and the Direct Transfer message is included in the last message, which is RRCConnectionSetupComplete. The RRCConnectionSetupComplete message may comprise selected PLMN identity as an index identifying an entry in the list of PLMNs broadcasted in the system information DedicatedInfoNAS, which contains a bit string. The bit string indicates whether the message is sent with authentication and/or encryption.

Furthermore, the UE may send additional Direct Transfer messages on a need basis using the ULInformationTransfer message over RRC, which RAN transparently forwards to the core network. In such a message, the UE may indicate that the Direct Transfer message is intended for ETC (Evolved Packet Core) or a cdma2000 core network.

FIG. 1 shows a schematic overview of an exemplifying radio communication network 100. The radio communication network 100 is in this example an LTE network. In other examples, the radio communication network may be a WCDMA network. Notably, the methods and arrangements disclosed herein are generally applicable to radio communication networks. The radio communication network 100 comprises a relay node 110, a radio network node 120, a core network 130 and a mobile terminal 140.

Moreover, it may be noted that, as used herein, the expression "radio network node" may be a radio base station, an eNodeB, a Radio Network Controller (RNC) or a node with similar functionality for the radio communication network.

Figure 2:
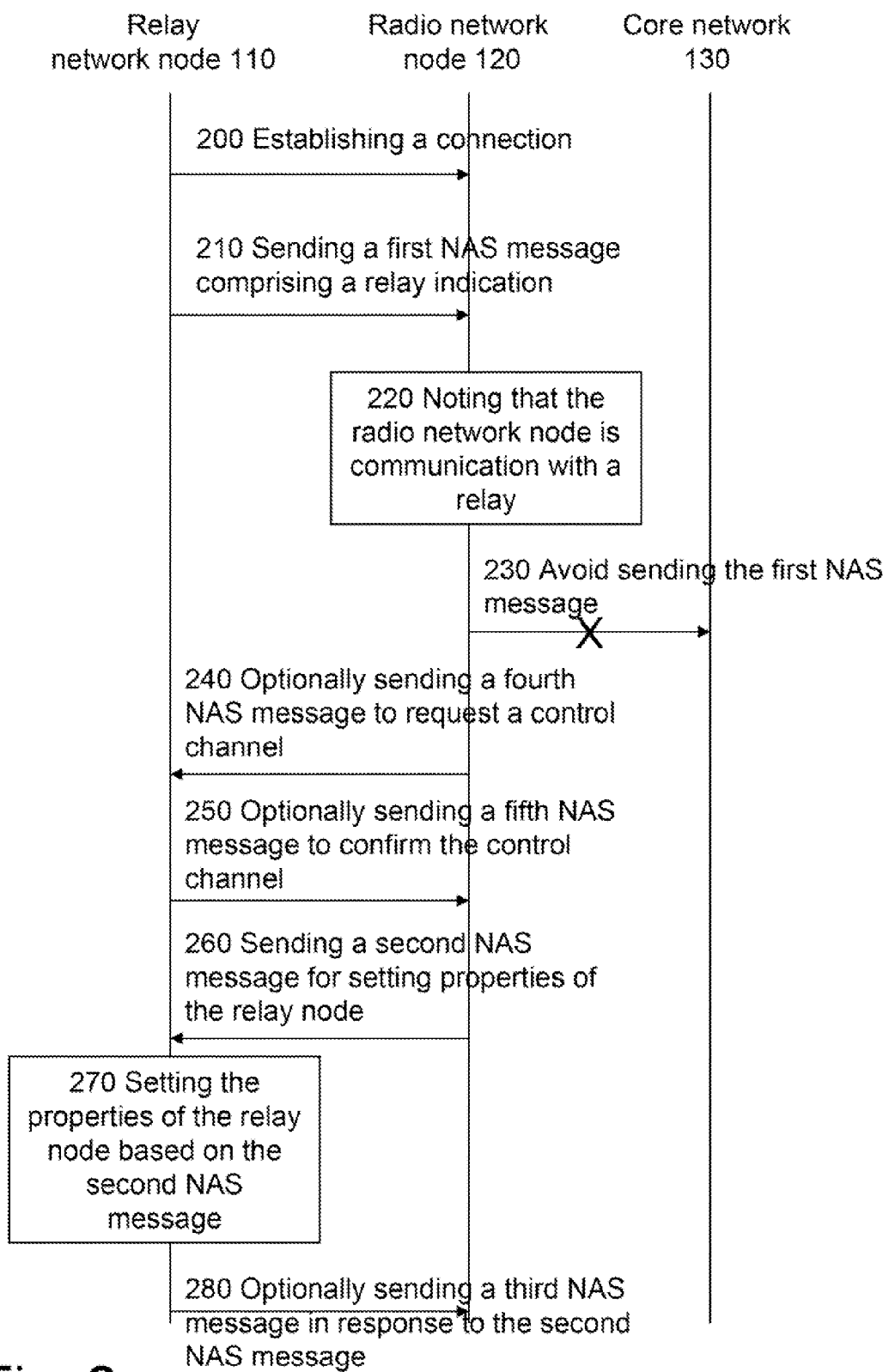
FIG. 2 shows a schematic, combined signalling and flow chart of an embodiment of the method according to the present invention performed in the radio communication network of FIG. 1.

Now referring to FIG. 2, there is shown a schematic, combined signalling and flow chart of an embodiment of the method according to the present invention performed in the radio communication network 100 of FIG. 1. The following steps may be performed. Optional steps have been indicated as such. It may be noted that a first, a second, a third, a forth and a fifth Direct Transfer message may be sent between the relay node 110 and the radio network node 120. These Direct Transfer messages do not appear in order in the description below, since the third, forth and fifth Direct Transfer messages are optional. Thus, when the optional steps are omitted, only a first and a second Direct Transfer message are sent between the relay node 110 and the radio network node 120.

Step 200 A connection for sending Direct Transfer messages between the relay node 110 and the radio network node 120 is established (or setup). Optionally, rules and/or coding scheme for a Direct Transfer connection between a mobile terminal and a core network node may apply to the established connection. In other words, the connection may, optionally, be of the same type as a connection for sending Direct Transfer messages between a mobile terminal and a core network node, i.e. same rules, procedures for coding and/or information content structure apply to this connection as applies to a standard connection between a mobile terminal and a core network node. The connection may comprise a radio bearer of the radio communication network.

Step 210 The relay node 110 sends to the radio network node 120 a first Direct Transfer message, comprising a relay indication, indicating to the radio network node 120 that the first Direct Transfer message is sent from the relay node 110. The first Direct Transfer message may be a first message in the form of a Direct Transfer message. The expression "in the form of" is to be interpreted, as meaning that the first message has the structure of a Direct Transfer message. The structure of a Direct Transfer message is specified by telecommunication standards. Notably, throughout this disclosure the expression "first/second/third/forth/fifth Direct Transfer message" has the above mentioned meaning.

Step 230 The radio network node 120 detects that the first Direct Transfer message is sent from a relay node and does not forward the first Direct Transfer message to the core network 130.

Step 240 Optionally, the relay node 110 receives from the radio network node 120 a fourth Direct Transfer message, indicating that the radio network node 120 has detected that the first Direct Transfer message was sent from the relay node 110.

Step 250 Optionally, the relay node 110 sends to the radio network 120 a fifth Direct Transfer message, indicating to the radio network node 120 that a control channel between the radio network node 120 and the relay node 110 is established, wherein the control channel enables setting of properties of the relay node 110. In this manner, the control channel may be used to set (or adjust) of properties of the relay node 110. It is to be understood that the control channel is established over the connection. Accordingly, the control channel is associated with the connection. It may be preferred to implement step 240 and step 250 such that the steps 240, 250 may cooperate to form a request/confirm pair; i.e. a request for a control channel in step 240 and a confirmation of the request if successful in step 250.

Step 260 The relay node 110 receives from the radio network node 120 a second Direct Transfer message, comprising setting information for setting properties of the relay node 110.

Step 270 The relay node 110 sets the properties of the relay node 110 based on the setting information. As a consequence, the relay node 110 may be controlled by the radio network node 120.

Step 280 Optionally, the relay node 110 sends, in response to the second Direct Transfer message, to the radio network node 120 a third Direct Transfer message, comprising, information for confirming reception of the second Direct Transfer message and/or information based on the properties of the relay node 110 and/or the setting information. As a result, the radio network node 120 may, for example, resend setting information or the like if the relay node 110 has not received the setting information sent in the step 260.

It shall be noted that since relays need to be more integrated in the protocol stack than repeaters. There is a need for setting properties of relays as well. Therefore, a control channel for setting properties of the relay is provided. The control channel connects to an RNC, in case of WCDMA, and to an eNodeB, in case of LTE.

In embodiments of the method in the radio communication network 100, there is implemented a deliberate, unambiguously detectable deviation from Direct Transfer message protocol standards, whereby detection of the relay node 110 is enabled. Alternatively or additionally, the use of a reserved (or unused) establishment cause enables indication to the radio network node that the radio network node is communication with the relay node 110.

It may be noted that properties of the relay node may be one or more of power level of signal output from the relay node, coding scheme applied to signal output from the relay node and the like.

In some embodiments of the method in the radio communication network 100, the step of establishing a connection may comprise the following steps. In a step, the relay node 110 selects a cell served by the radio network node 120. Next, the relay node 110 receives and reads system information associated with the cell. The system information is sent (or broadcast) by the radio network node 120. In a further step, the relay node 110 performs random access to the radio network node 120. Then, the relay node 110 establishes a RRC (Radio Resource Control) connection to the radio network node. Hence, the connection in step 200 is a RRC connection. Thus, it is the relay node 110 that initiates and completes the connection to the radio network node 120. Normally, a relay node 110 may only create a connection to a radio network node 120 as a result of being activated by a mobile terminal 140.

In some embodiments of the method in the radio communication network 100, only a Direct Transfer message or Direct Transfer messages, comprising the relay indication, is/are used for setting properties of the relay node. As a result, only a message or messages tagged with the relay indication with be recognized by the relay node and the radio network node. Advantageously, any other Direct Transfer messages with not erroneously be taken as messages associated with the procedure of setting properties of the relay. Alternatively, a sequence of Direct Transfer messages following a Direct Transfer message, comprising a relay indication are used for setting properties of the relay node. Optionally, the first Direct Transfer message comprising the relay indication may also comprise information about the length of the sequence of Direct Transfer message to be used for setting properties of the relay. Alternatively, the number of Direct Transfer messages may be predefined. Further, the length of the sequence of Direct Transfer messages may be determined by an end indication comprised in the last Direct Transfer message of the sequence. Thereby, eliminating the need for resending the relay indication with every message associated with the procedure of setting properties of the relay node. Advantageously, the amount of information that needs to be sent is reduced.

Figure 3:
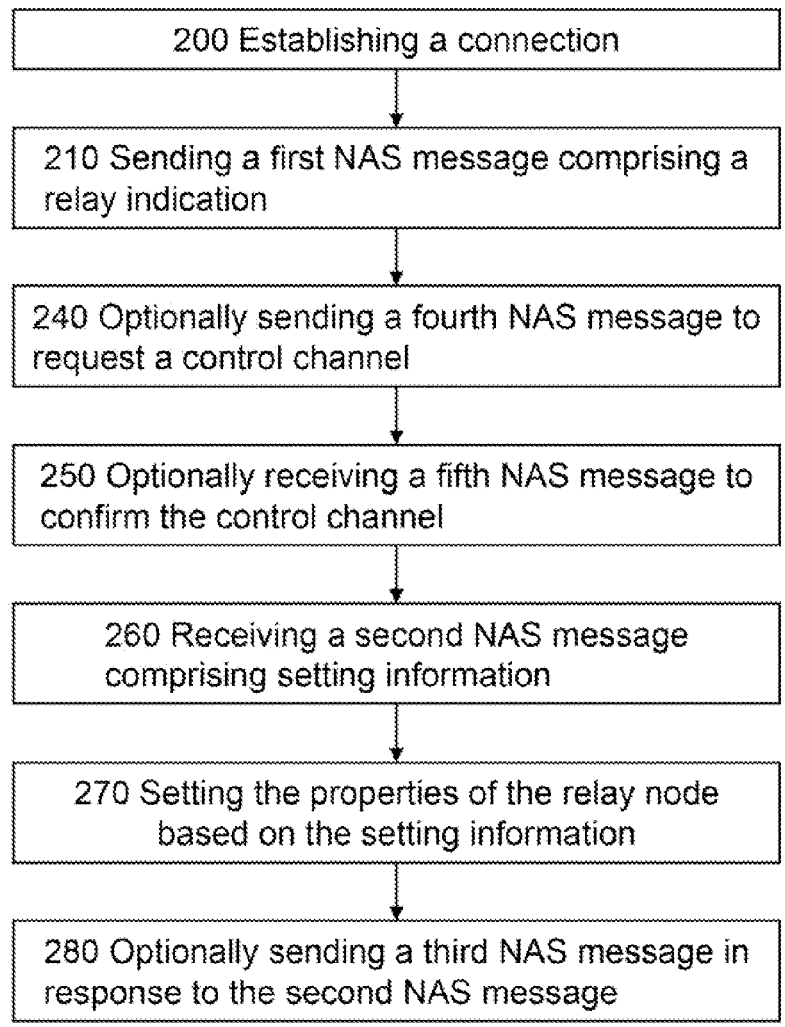
FIG. 3 shows a schematic flow chart of an embodiment of the method in the relay node.

In FIG. 3, there is illustrated an exemplifying method in the relay node 110 for setting properties of the relay node 110. The relay node 110 and a radio network node 120 are comprised in a radio communication network 100. The method may comprise the following steps. Optional steps have been indicated as such.

Step 200 The relay node 110 establishes a connection for sending Direct Transfer messages between the relay node 110 and the radio network node 120.

Step 210 The relay node 110 sends to the radio network node 120 a first Direct Transfer message, comprising a relay indication, indicating to the radio network node 120 that the first Direct Transfer message is sent from the relay node 110.

Step 240 Optionally, the relay node 110 receives from the radio network node 120 a fourth Direct Transfer message, indicating that the radio network node 120 has detected that the first Direct Transfer message was sent from the relay node 110.

Step 250 Optionally, the relay node 110 sends to the radio network node 120 a fifth Direct Transfer message, indicating to the radio network node 120 that a control channel between the radio network node 120 and the relay node 110 is established, wherein the control channel enables setting of properties of the relay node 110. In this manner, the control channel ma be used to set (or adjust) of properties of the relay node 110.

It may be preferred to implement step 240 and step 250 such that the steps 240, 250 may cooperate to form a request for a control channel, i.e. step 240 and a confirmation of the request if successful, i.e. step 250.

Step 260 The relay node 110 receives from the radio network node 120 a second Direct Transfer message, comprising setting information for setting properties of the relay node 110.

Step 270 The relay node 110 sets the properties of the relay node 110 based on the setting information. As a consequence, the relay node 110 may be controlled by the radio network node 120.

Step 280 Optionally, the relay node 110 sends, in response to the second Direct Transfer message, to the radio network node 120 a third Direct Transfer message, comprising information for confirming reception of the second Direct Transfer message and/or information based on the properties of the relay node 110 and/or the setting information.

In some embodiments of the method in the relay node 110, the relay indication comprises at least one of a PLMN identity which is different from the PLMN identities comprised in system information broadcast by the radio network node 120, a PLMN type, which is different, from the PLMN type comprised in the Intra Domain NAS node selector, or a reserved establishment cause. In this manner, the introduction of the relay indication is made without affecting the core network.

In some embodiments of the method in the relay node 110, the relay indication is built up by a dedicated bit pattern in the NAS message part of the Direct Transfer message, such as a reserved bit pattern or a combination of a security header type and a message part associated with a different security header type. The NAS message part is not possible to decode in the radio network node, but it is possible to identify a dedicated bit pattern, Furthermore, the security header type informs the receiver of the NAS message part about how security is employed, but if the security does not meet what is expected, then this can be interpreted as an intentional fault and therefore a relay indication.

Figure 4:
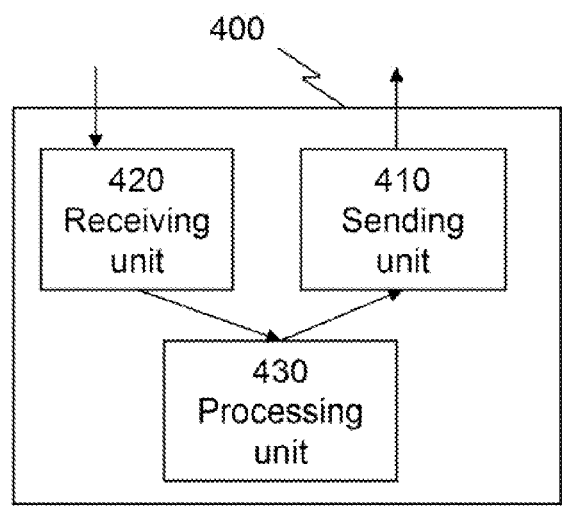
FIG. 4 shows a schematic block diagram of an embodiment of the arrangement in the relay node.

With reference to FIG. 4, there is demonstrated a schematic block diagram of an embodiment of the arrangement 400 in the relay node 110 for setting properties of the relay node 110. The arrangement 400 may be comprised in the relay node 110. The relay node 110 and a radio network node 120 are comprised in a radio communication network 100. The arrangement 400 comprises a processing unit 430 configured to establish a connection for sending Direct Transfer messages between the relay node 110 and the radio network node 120, a sending unit 410 configured to send a first Direct Transfer message to the radio network node 120, wherein the first Direct Transfer message comprises a relay indication, indicating, to the radio network node 120 that the first Direct Transfer message is sent from the relay node 110, and a receiving unit 420 configured to receive from the radio network node 120 a second Direct Transfer message, comprising setting information for setting properties of the relay node 110. The processing unit 430 is further configured to set the properties of the relay node 110 based on the setting information.

In some embodiments of the arrangement 400 in the relay node 110, the receiving unit 420 further is configured to receive from the radio network node 120 a fourth Direct Transfer message, indicating that the radio network node 120 has detected that the first Direct Transfer message was sent from the relay node 110.

In some embodiments of the arrangement 400 in the relay node 110, the sending unit 410 further is configured to send to the radio network node 120 a fifth Direct Transfer message, indicating to the radio network node 120 that a control channel between the radio network node 120 and the relay node 110 is established. The control channel enables setting of properties of the relay node 110, in this manner, the control channel may be used to set (or adjust) of properties of the relay node 110.

In some embodiments of the arrangement 400 in the relay node 110, the sending unit 410 further is configured to send, in response to the second Direct Transfer message, to the radio network node 120 a third Direct Transfer message, comprising information for confirming reception of the second Direct Transfer message and/or information based on the properties of the relay node 110 and/or the setting information.

In some embodiments of the arrangement 400 in the relay node 110, the relay indication comprises at least one of a PLMN identity which is different from the PLMN identities comprised in system information broadcast by the radio network node 120, a PLMN type, which is different from the PLMN type comprised in the Intra Domain NAS node selector, or a reserved establishment cause.

In some embodiments of the arrangement 400 in the relay node 110, the relay indication is built up by a dedicated bit pattern in the NAS message part of the Direct Transfer message, such as a reserved bit pattern or a combination of a security header type and a message part associated with a different security header type. The NAS message part is not possible to decode in the radio network node, but it is possible to identify a dedicated bit pattern, Furthermore, the security header type informs the receiver about how security is employed, but if the security does not meet what is expected, then this can be interpreted as an intentional fault and therefore a relay indication.

Figure 5:
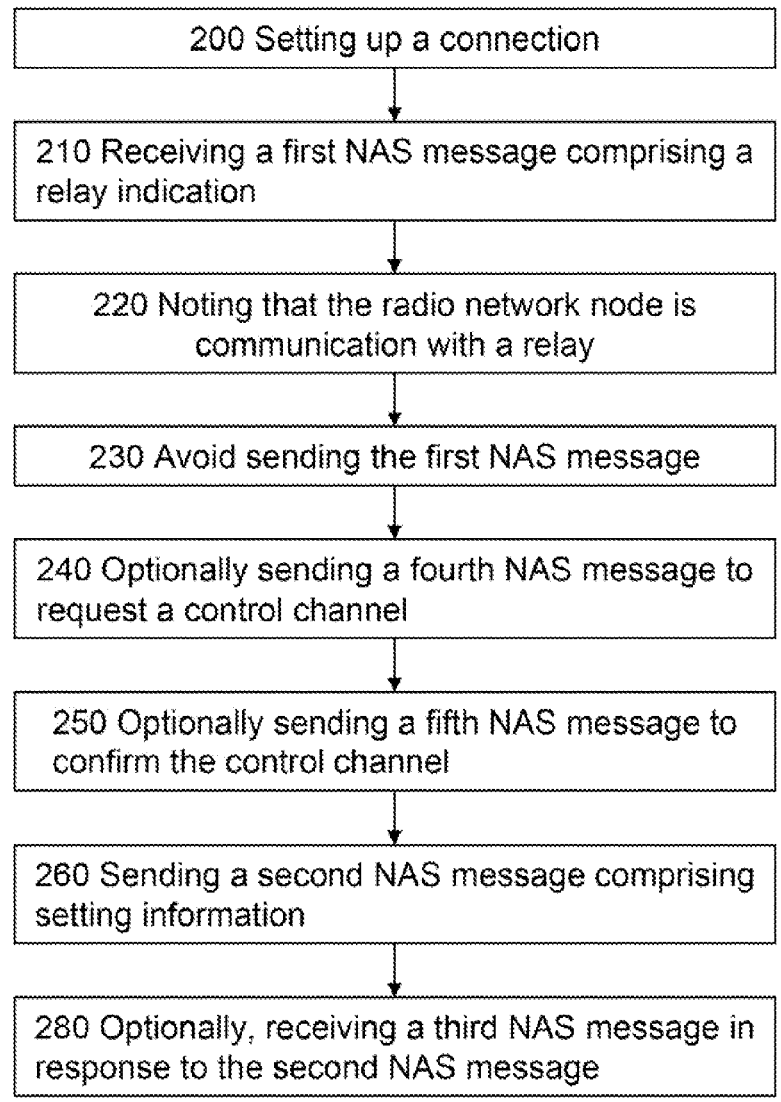
FIG. 5 shows a schematic flow chart of an embodiment of the method in the radio network node.

FIG. 5 shows a schematic flow chart of an embodiment of the method in the radio network node 120 for setting properties of the relay node 110. The relay node 110 and the radio network node 120 are comprised in a radio communication network 100. The method may comprise the following steps. Optional steps have been indicated as such.

Step 200 The radio network node 120 sets up (or establishes) a connection on request from the relay node 110.

Step 210 The radio network node 120 receives from the relay node 110 a first Direct Transfer message, comprising, a relay indication, indicating to the radio network node 120 that the first Direct Transfer message is received from the relay node 110.

Step 240 Optionally, the radio network node 120 sends to the relay node 110 a fourth Direct Transfer message, indicating that the radio network node 120 has detected that the first Direct Transfer message was sent from the relay node 110.

Step 230 The radio network node 120 avoids sending the first Direct Transfer message to the core network 130, because the radio network node 120 has detected that the first Direct Transfer message was sent by a relay node 110.

Step 250 Optionally, the radio network node 120 receives from the relay node 110 a fifth Direct Transfer message, indicating to the radio network node 120 that a control channel between the radio network node 120 and the relay node 110 is established, wherein the control channel enables setting of properties of the relay node 110. As a result, the control channel may be used to set (or adjust) properties of the relay node 110.

Again, it may be preferred to implement step 240 and 250 as explained in conjunction with FIG. 3.

Step 260 The radio network node 120 sends to the relay node 110 a second Direct Transfer message, comprising setting information for setting properties of the relay node 110.

Step 280 Optionally, the radio network node 120 receives, in response to the second Direct Transfer message, from the relay node 110 a third Direct Transfer message, comprising information confirming reception of the second Direct Transfer message and/or information based on the properties of the relay node 110 and/or the setting information.

In some embodiments of the method in the radio network node 120, the relay indication comprises at least one of a PLMN identity which is different from the PLMN identities comprised in system information broadcast by the radio network node 120, a PLMN type, which is different from the PLMN type comprised in the Intra Domain NAS node selector, or a reserved establishment cause.

In some embodiments of the method in the radio network node 120, the relay indication is built up by a dedicated bit pattern in the NAS message part of the Direct Transfer message, such as a reserved bit pattern or a combination of a security header type and a NAS message part associated with a different security header type.

Figure 6:
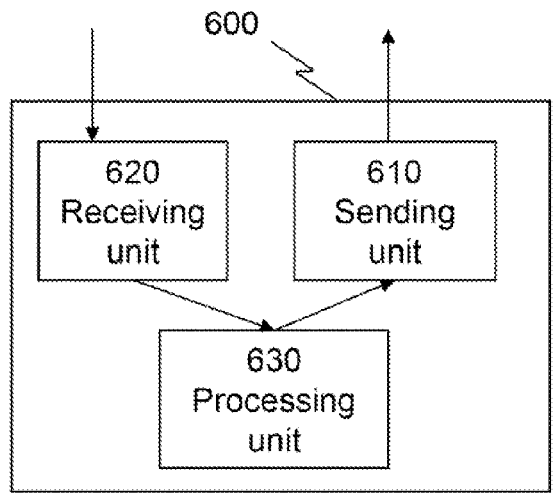
FIG. 6 shows a schematic block diagram of an embodiment of the arrangement in the radio network node.

FIG. 6 shows a schematic block diagram of an embodiment of an arrangement 600 in a radio network node 120 the setting properties of the relay node 110. The arrangement 600 may be comprised in the radio network node 120. The relay node 110 and the radio network node 120 are comprised in a radio communication network 100. The arrangement 600 comprises a processing unit 630 configured to set up a connection on request from the relay node 110. The arrangement further comprises a receiving unit 620 configured to receive from the relay node 110 a first Direct Transfer message, comprising a relay indication, indicating to the radio network node 120 that the first Direct Transfer message is received from the relay node 110, and a sending unit 610 configured to send to the relay node 110 a second Direct Transfer message, comprising setting information for setting, properties of the relay node 110.

In some embodiments of the arrangement 600 in the radio network node 120, the sending unit 610 further is configured to send to the relay node 110 a fourth Direct Transfer message, indicating that the radio network node 120 has detected that the first Direct Transfer message was sent from the relay node 110.

In some embodiments of the arrangement 600 in the radio network node 120, the receiving unit 620 further is configured to receive from the relay node 110 a fifth Direct Transfer message, indicating to the radio network node 120 that a control channel between the radio network node 120 and the relay node 110 is established. The control channel enables setting of properties of the relay node 110. As a result, the control channel may be used to set (or adjust) properties of the relay node 110.

In some embodiments of the arrangement 600 in the radio network node 120, the receiving unit 620 further is configured to receive, in response to the second Direct Transfer message, from the relay node 110 a third Direct Transfer message, comprising information confirming reception of the second Direct Transfer message and/or information based on the properties of the relay node 110 and/or the setting information.

In some embodiments of the arrangement 600 in the radio network node 120, the relay indication comprises at least one of a PLMN identity which is different from the PLMN identities comprised in system information broadcast by the radio network node 120, a PLMN type, which is different from the PLMN type comprised in the intra Domain NAS node selector, or a reserved establishment cause.

In some embodiments of the arrangement 600 in the radio network node 120, the relay indication is built up by a dedicated bit pattern in the NAS message part of the Direct Transfer message, such as a reserved bit pattern or a combination of a security header type and a NAS message part associated with a different security header type.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method in a forwarding node for setting properties of the forwarding node, wherein the forwarding node comprises a relay or a repeater, the method comprising:
   establishing a radio resource control (RRC) connection for sending Direct Transfer messages between the forwarding node and a radio network node, wherein the Direct Transfer messages are container messages configured to carry non-access stratum (NAS) messages;
   sending to the radio network node a first Direct Transfer message comprising a relay indication indicating to the radio network node that the first Direct Transfer message was sent from the forwarding node and should not be forwarded to a core network node;
   receiving from the radio network node a second Direct Transfer message generated by the radio network node in response to receiving the relay indication, the second Direct Transfer message comprising setting information; and
   setting properties of signals output from the forwarding node based on the setting information.

2. The method of claim 1, further comprising:
   in response to the second Direct Transfer message, sending to the radio network node a third Direct Transfer message comprising information for confirming reception of the second Direct Transfer message and/or information based on the properties of the forwarding node and/or the setting information.

3. The method of claim 1, further comprising before receiving the second Direct Transfer message:
   receiving from the radio network node a fourth Direct Transfer message indicating that the radio network node has detected the relay indication in the first Direct Transfer message indicating that the first Direct Transfer message was sent from the forwarding node; and
   sending to the radio network node a fifth Direct Transfer message indicating to the radio network node that a control channel between the radio network node and the forwarding node is established, wherein the control channel enables setting of the properties of the forwarding node.

4. The method of claim 1, wherein the relay indication comprises at least one of:
   a Public Land Mobile Network (PLMN) identity, which is different from PLMN identities comprised in system information broadcast by the radio network node;
   a PLMN type, which is different from PLMN types comprised in an Intra Domain NAS node selector; and
   a reserved establishment cause.

5. The method of claim 1, wherein the relay indication is built up by a dedicated bit pattern, and wherein the dedicated bit pattern comprises a reserved bit pattern or a combination of a security header type and a message associated with a different security header type.

6. An apparatus configured for use in a forwarding node capable of setting properties of the forwarding node, wherein the forwarding node comprises a relay or a repeater, the apparatus comprising:
   a processor configured to establish a radio resource control (RRC) connection for sending Direct Transfer messages between the forwarding node and a radio network node, wherein the Direct Transfer messages are container messages configured to carry non-access stratum (NAS) messages;
   a transmitter configured to transmit a first Direct Transfer message to the radio network node, wherein the first Direct Transfer message comprises a relay indication indicating to the radio network node that the first Direct Transfer message was sent from the forwarding node and should not be forwarded to a core network node; and
   a receiver configured to receive from the radio network node a second Direct Transfer message comprising setting information, wherein the processor is further configured to set properties of signals output from the forwarding node based on the setting information.

7. The apparatus of claim 6, wherein the transmitter is further configured to:
   in response to the second Direct Transfer message, transmit to the radio network node a third Direct Transfer message comprising information for confirming reception of the second Direct Transfer message and/or information based on the properties of the forwarding node and/or the setting information.

8. The apparatus of claim 6, wherein:
   the receiver is further configured to receive a fourth Direct Transfer message from the radio network node before receiving the second Direct Transfer message, wherein the fourth Direct Transfer message indicates that the radio network node has detected the relay indication in the first Direct Transfer message indicating that the first Direct Transfer message was sent from the forwarding node; and
   the transmitter is further configured to transmit to the radio network node a fifth Direct Transfer message indicating to the radio network node that a control channel between the radio network node and the forwarding node is established, wherein the control channel enables setting of the properties of the forwarding node.

9. The apparatus of claim 6, wherein the relay indication comprises at least one of:
   a Public Land Mobile Network (PLMN) identity, which is different from PLMN identities comprised in system information broadcast by the radio network node;
   a PLMN type, which is different from PLMN types comprised in an Intra Domain NAS node selector; and
   a reserved establishment cause.

10. The apparatus of claim 6, wherein the relay indication is provided by a dedicated bit pattern, and wherein the dedicated bit pattern comprises a reserved bit pattern or a combination of a security header type and a message associated with a different security header type.

11. A method in a radio network node for setting properties of a forwarding node, the method comprising:
   setting up a radio resource control (RRC) connection on request between a radio network node and the forwarding node, wherein the forwarding node comprises either a relay or a repeater and the RRC connection is configured to communicate Direct Transfer messages comprising container messages configured to carry non-access stratum (NAS) messages;
   receiving from the forwarding node a first Direct Transfer message comprising a relay indication indicating to the radio network node that the first Direct Transfer message is received from the forwarding node and should not be forwarded to a core network node; and
   in response to detecting the relay indication in the first Direct Transfer message, generating a second Direct Transfer message and sending the second Direct Transfer message to the forwarding node, the second Direct Transfer message comprising setting information for setting properties of signals output from the forwarding node.

12. The method of claim 11, further comprising receiving, in response to the second Direct Transfer message, from the forwarding node a third Direct Transfer message comprising information confirming reception of the second Direct Transfer message and/or information based on the properties of the forwarding node and/or the setting information.

13. The method of claim 11, further comprising before receiving the second Direct Transfer message:
   sending to the forwarding node a fourth Direct Transfer message indicating that the radio network node has detected that the first Direct Transfer message included the relay indication indicating that the first Direct Transfer message was sent from the forwarding node; and
   receiving from the forwarding node a fifth Direct Transfer message indicating to the radio network node that a control channel between the radio network node and the forwarding node is established, wherein the control channel enables setting of the properties of the forwarding node.

14. The method of claim 11, wherein the relay indication comprises at least one of:
   a Public Land Mobile Network (PLMN) identity, which is different from PLMN identities comprised in system information broadcast by the radio network node;
   a PLMN type, which is different from PLMN types comprised in an Intra Domain NAS node selector; and
   a reserved establishment cause.

15. The method of claim 11, wherein the relay indication is built up by a dedicated bit pattern, wherein the dedicated bit pattern comprises a reserved bit pattern or a combination of a security header type and a message associated with a different security header type.

16. An apparatus configured for use in a radio network node for setting properties of a forwarding node that comprises a relay or a repeater, the apparatus comprising:
   a receiver configured to receive from the forwarding node, via a radio resource control (RRC) connection, a first Direct Transfer message comprising a relay indication indicating to the radio network node that the first Direct Transfer message is received from the forwarding node and should not be forwarded to a core network node; and
   a transmitter configured to transmit to the forwarding node, via the RRC connection, a second Direct Transfer message comprising setting information for setting properties of signals output from the forwarding node,
   wherein the second Direct Transfer message is transmitted in response to reception of the relay indication, and wherein the first and second Direct Transfer messages are container messages configured to carry non-access stratum (NAS) messages.

17. The apparatus of claim 16, wherein the receiver is further configured to receive, in response to the second Direct Transfer message, from the forwarding node a third Direct Transfer message comprising information confirming reception of the second Direct Transfer message and/or information based on the properties of the forwarding node and/or the setting information.

18. The method of claim 16, wherein:
   the transmitter is further configured to transmit to the forwarding node a fourth Direct Transfer message before the receiver receives the second Direct Transfer message, wherein the fourth Direct Transfer message indicates that the radio network node has detected that the first Direct Transfer message included the relay indication indicating that the first Direct Transfer message was sent from the forwarding node; and
   the receiver is further configured to receive from the forwarding node a fifth Direct Transfer message indicating to the radio network node that a control channel between the radio network node and the forwarding node is established, wherein the control channel enables setting of the properties of the forwarding node.

19. The apparatus of claim 16, wherein the relay indication is provided by a dedicated bit pattern, wherein the dedicated bit pattern comprises a reserved bit pattern or a combination of a security header type and a message associated with a different security header type.

20. The method of claim 1, wherein the properties of the signals output from the forwarding node comprise at least one of a power level of the signals output from the forwarding node and a coding scheme applied to the signals output from the forwarding node.

* * * * *